Patented Dec. 14, 1926.

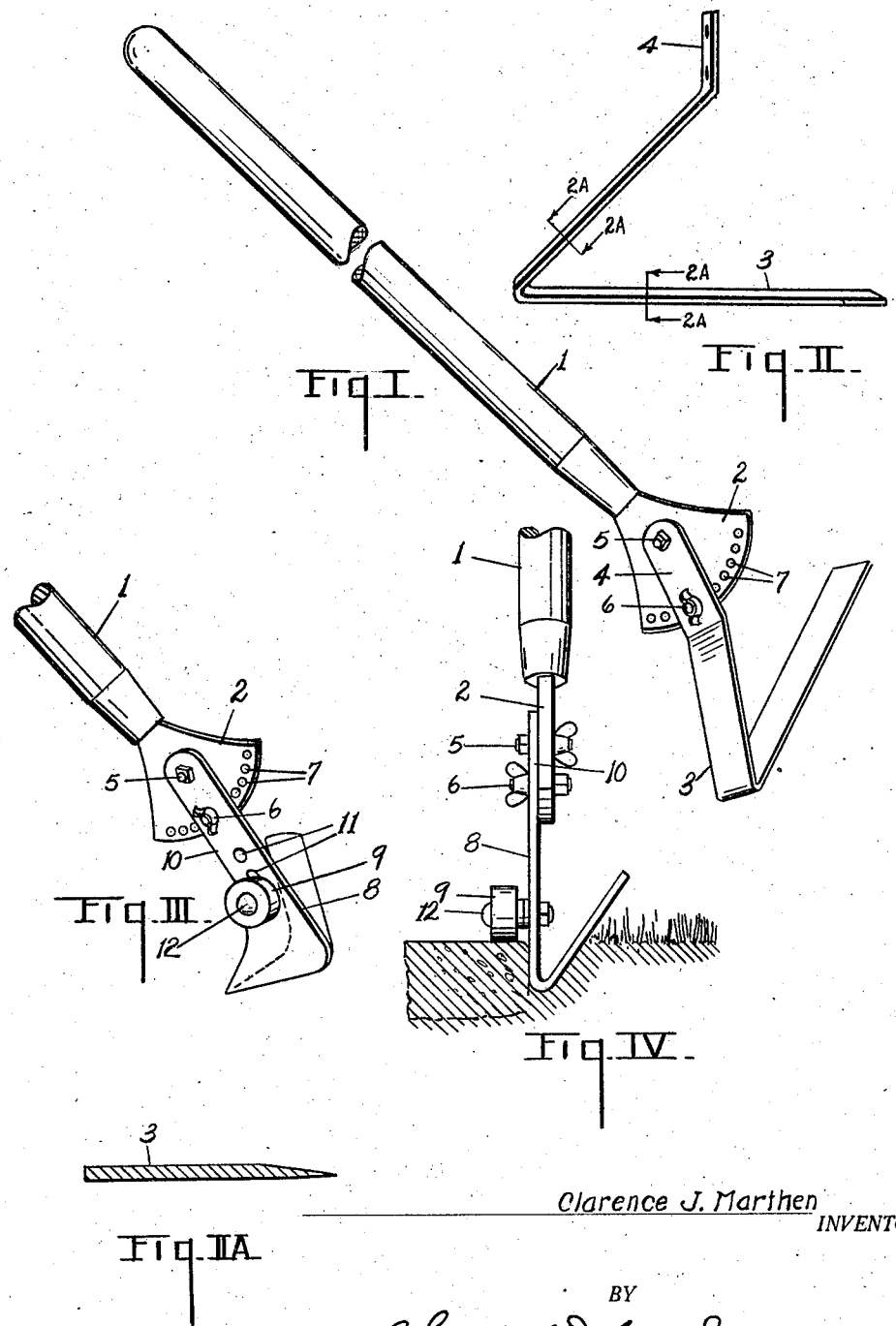

1,610,874

UNITED STATES PATENT OFFICE.

CLARENCE J. MARTHEN, OF KALAMAZOO, MICHIGAN, ASSIGNOR OF ONE-HALF TO WALTER LEE HUNTER, OF KALAMAZOO, MICHIGAN.

COMBINED HOE AND EDGER.

Application filed November 13, 1922. Serial No. 600,773.

This invention relates to improvements in combined hoes and edgers.

The main object of the invention is to provide an improved implement which may be used as a hoe or weed cutter and as a trimming or edging tool for the trimming of lawns, along the edges of walks, garden paths and the like.

A further object is to provide an improved garden or lawn implement which may be adjusted to suit the requirements of the person using the tool; for instance, according to the work to be performed or the height of the person.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a perspective view of my improved implement, the handle being partially broken away.

Fig. II is a rear elevation of the blade shown in Fig. I.

Fig. II$^A$ is a cross section through the blade on a line corresponding to either of the lines 2$^A$—2$^A$ of Fig. II.

Fig. III is a perspective view of a slightly modified form of my invention in which the blade is provided with a gaging roller.

Fig. IV is a detail rear view of the embodiment shown in Fig. III, the same being shown in operative relation to a walk.

In the drawing similar reference characters refer to similar parts throughout the several views.

Referring to the drawing, the handle 1 is of suitable size and length and is provided with a blade-like shank member 2. The V-shaped blade 3 has a flat shank extension 4 at one end of one arm thereof. These shank members 2 and 4 are secured together by the pivot bolt 5 and the adjusting bolt 6 which may be selectively engaged with any of the holes 7 which are disposed in the arc of a circle concentric with the bolt 5. This permits the adjustment of the blade to vary its angle relative to the handle to accommodate persons of different height and also to adjust the blade for different uses.

In the modification shown in Figs. III and IV the blade 8 is also V-shaped and is secured to the handle in the same manner as described. This blade is provided with a guide roller 9 adjustably secured to the shank 10 which is provided with a series of holes 11 adapted to receive the bolt 12 constituting the journal for the roller. The roller is adapted to travel along the edge of a walk for gaging the depth of the cut of the tool or along the ground for gaging the depth of the tool when trimming garden paths and the like.

My improved tool is very convenient to use and enables the performance of a large amount of labor with a minimum of effort.

Having thus described my invention, what I claim as new and desire to secure by Letters Patent, is:

1. In an implement of the class described, the combination of a handle provided with a blade-like shank member, a V-shaped blade having a shank member extending from the end of one arm of the blade, the outer arm of the blade lying in a plane at right angles to the shank, a pivot bolt securing the end of said blade shank member to said handle shank member, and a second securing bolt for said shank members, said handle shank member being provided with a series of holes with which said second bolt may be selectively engaged and disposed in an arc concentric to said pivot bolt.

2. In an implement of the class described, the combination of a handle provided with a blade-like shank member, a blade comprising an outer arm and an inner arm disposed at an acute angle to said outer arm and terminating in a shank disposed at right angles to the outer arm and centrally thereof, a pivot bolt securing the end of said blade shank member to said handle shank member, a second securing bolt for said shank members, said handle shank member being provided with a series of holes with which said second bolt may be selectively engaged, whereby the angle of the blade to the handle may be varied.

3. In an implement of the class described, the combination of a handle provided with a blade-like shank member, a V-shaped blade formed of a flat piece of metal of uniform width from end to end and having a shank portion extending from one arm thereof substantially at right angles to the other arm and disposed upon the side of said handle shank, a pivot bolt securing the end of said blade shank to said handle shank, and a second securing bolt for said shank members, said handle shank being provided with a series of holes with which said second securing bolt may be selectively engaged and disposed in an arc concentric to said pivot bolt.

In witness whereof, I have hereunto set my hand and seal.

CLARENCE J. MARTHEN. [L. S.]